Sept. 23, 1958    L. R. WILCOX    2,853,349
RACK AND TRAY SERVICE
Filed March 22, 1957
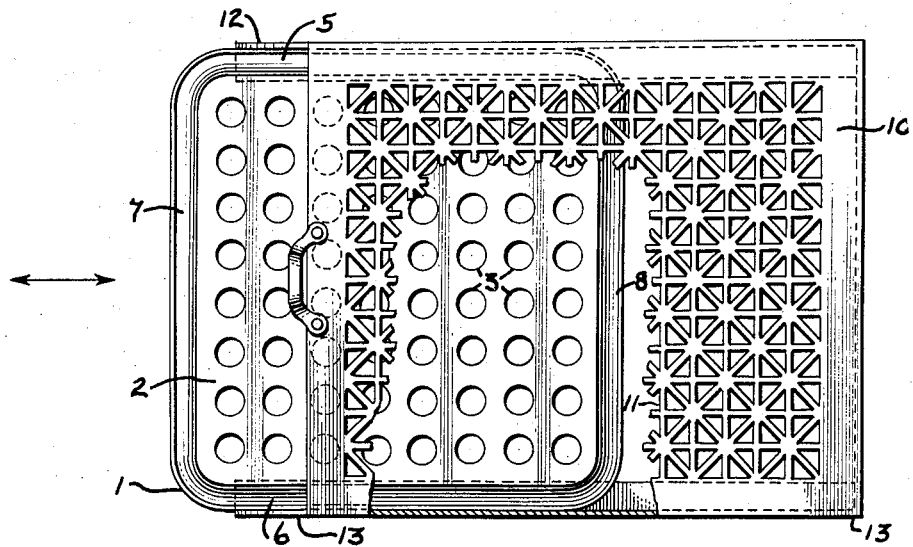
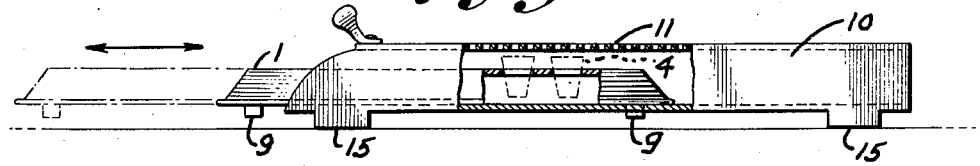
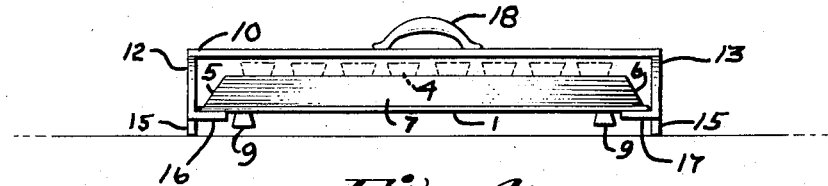
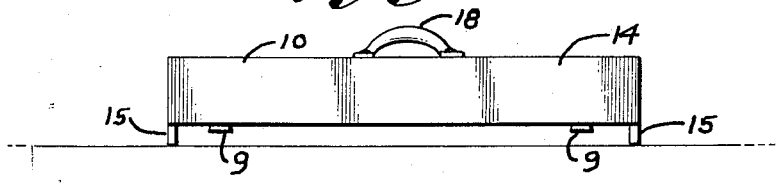
INVENTOR
Louise Reese Wilcox
BY
ATTORNEY

United States Patent Office 2,853,349
Patented Sept. 23, 1958

2,853,349

RACK AND TRAY SERVICE

Louise Reese Wilcox, Richmond, Va.

Application March 22, 1957, Serial No. 647,779

3 Claims. (Cl. 312—33)

This invention relates to a new and useful improvement in a rack and tray service, particularly to use in religious communion services.

As now practiced in church communion services the communicants or church members participating in such services, either go to the altar of a church where wine or other approved liquid is served them from glasses generally deposited in trays, or the trays with the glasses are passed to the members who are served while seated in the pews. After a member partakes of communion, the glass is returned to the server, who replaces it in the tray either empty or partially empty; depending upon the quantity taken by the participant.

When communion is served to a large congregation it becomes necessary to wash or cleanse the glasses, and as now practiced, this takes considerable time.

One of the objects of this invention is the provision of a tray adapted to hold a plurality of glasses housed in the rack.

Another object of this invention is the provision of a tray holder for glasses housed in a rack having a perforated top so that the tray, rack and objects held in said tray may be immersed in a liquid and said glasses thereby cleansed in one operation.

Other objects and features will more fully appear from the following description and accompanying drawings in which:

Fig. 1 is a top plan view showing the tray partially housed in the rack with a portion of the top of the latter broken away;

Fig. 2 is a side elevational view showing the tray partially housed in the rack with side portion broken away;

Fig. 3 is a front elevational view showing the tray with glasses therein housed in the rack, and Fig. 4 is a rear elevation view of the rack.

Referring more particularly to the drawings, a tray 1 consists of a top 2 provided with a plurality of apertures 3 for seating and holding small flared glasses 4. Sides 5 and 6 also ends 7 and 8 depend from the top in an outwardly flared condition. Legs 9 are respectively secured to ends 7 and 8 for resting upon an object so as to hold the tray in spaced relation to said object, and thus provide means whereby an operative can easily grasp the tray for conveniently lifting same. The legs are secured to said ends away from said sides, as clearly illustrated in Fig. 3.

A rack 10 is provided with a perforated top 11, preferably, articulate, as shown, sides 12 and 13 and an end 14. The rack is also provided with supports 15 secured to sides 12 and 13 and depending therefrom. Tracks or supports 16 and 17 are secured to the sides of said rack and project inwardly therein and constituting slide ways for said tray in a common plane adapted to accommodate the tray in slidable fashion. A handle 18 is secured to the top of the rack at one end thereof for lifting it as well as the housed tray in any suitable fashion.

It will be noted (Figs. 2 and 3) that the glasses 4 rest in the tray and their tops are in spaced relation to the perforated top of said rack and so distanced therefrom that their displacement from said tray cannot take place so long as the tray remains properly housed therein.

It is thought obvious that when the tray containing the glasses is properly housed in the rack, an operative may grasp the handle and submerse the rack, tray and glasses in a liquid and thereby quickly cleanse. The tray and the glasses having been cleansed, may then be readily used for communion.

While the main object of this invention is the provision of an article for religious purposes, it is to be understood that same may be enlarged to accommodate larger similar drinking glasses.

Having described this invention, what is claimed is:

1. In a rack and tray communion service set, said rack having a rectangular flat top portion reticulate throughout except along its four edge portions, said rack having narrow depending sides and one closed end and one open end, said sides having inturned slide way supports defining a common plane and constituting supports for said tray, whereby said tray can slide through the open end of said rack into and out of said rack, said tray having an outwardly flared portion throughout its perimeter constituting a support for said tray within said rack, said tray having apertures therein adapted to receive flared small communion drinking glasses individually nested in said apertured tray, said tray being substantially square whereby the tray may be inserted any edge foremost to house said tray with glasses therein in said rack and said glasses being retained in said rack and tray by the reticulate portion of said rack while the slide ways of said rack slidably support said tray and its contents.

2. The construction set forth in claim 1, wherein the sides of said rack are provided with depending supports to maintain said rack in a slightly elevated condition when said rack is placed on a table or the like.

3. The construction set forth in claim 1, wherein said tray is provided with additional supports comprising a plurality of short depending legs, whereby said tray can be supported in a slightly elevated condition when resting on a table or the like, whereby to facilitate the handling of said tray.

References Cited in the file of this patent

UNITED STATES PATENTS 201,601    Edwards et al. _____ Mar. 26, 1878